US007293590B2

(12) United States Patent
Martin

(10) Patent No.: US 7,293,590 B2
(45) Date of Patent: Nov. 13, 2007

(54) MULTIPLE TAPE LAYING APPARATUS AND METHOD

(75) Inventor: James P. Martin, Troy, NY (US)

(73) Assignee: ADC Acquisition Company, Schenectady, NY (US)

(*) Notice: Subject to any disclaimer, the term of this patent is extended or adjusted under 35 U.S.C. 154(b) by 204 days.

(21) Appl. No.: 10/946,433

(22) Filed: Sep. 21, 2004

(65) Prior Publication Data

US 2005/0061422 A1  Mar. 24, 2005

Related U.S. Application Data

(60) Provisional application No. 60/504,413, filed on Sep. 22, 2003.

(51) Int. Cl.
- *B29C 65/52* (2006.01)
- *B32B 37/16* (2006.01)
- *B32B 38/10* (2006.01)
- *B65C 9/18* (2006.01)
- *B65C 9/30* (2006.01)
- *B32B 37/20* (2006.01)
- *B65C 9/12* (2006.01)

(52) U.S. Cl. .................... 156/361; 156/353; 156/391; 156/582; 156/253; 156/527

(58) Field of Classification Search .............. 156/577, 156/353, 354, 522, 523, 391, 446, 494, 502, 156/527, 582, 574, 361
See application file for complete search history.

(56) References Cited

U.S. PATENT DOCUMENTS

| | | | | |
|---|---|---|---|---|
| 3,810,805 A | * | 5/1974 | Goldsworthy et al. | ...... 156/361 |
| 3,992,240 A | * | 11/1976 | Kuehn, Jr. | .................. 156/250 |
| 4,382,836 A | * | 5/1983 | Frank | .......................... 156/459 |
| 4,531,992 A | * | 7/1985 | Eaton | ......................... 156/152 |
| 7,063,118 B2 | * | 6/2006 | Hauber et al. | .............. 156/486 |

* cited by examiner

Primary Examiner—Philip Tucker
Assistant Examiner—Sonya Mazumdar
(74) Attorney, Agent, or Firm—Heslin Rothenberg Farley & Mesiti P.C.

(57) ABSTRACT

A fully automated method and apparatus is disclosed to laminate various structural articles with multiple layers of a resin impregnated fiber tape. The fiber tape is deposited with a tape laying member moving alternately in different travel directions. The tape laying member removes all backing layers from the tape being employed, then deposits the unbacked tape on the surface of the structural article and finally severs the end of the tape being deposited. An automated cut and restart procedure is employed in the present apparatus to increase throughput.

13 Claims, 6 Drawing Sheets

MULTIPLE TAPE LAYING APPARATUS AND METHOD

RELATED PROVISIONAL APPLICATION

This application claims the benefit of U.S. Provisional Application Ser. No. 60/504,413 filed by the present applicant on Sep. 22, 2003.

BACKGROUND OF THE INVENTION

The present application relates generally to an improved method and apparatus for continuously applying multiple strips of continuous fiber tape to form various laminated structural articles and, more particularly, to doing so with a resin prepreg tape in a more simple and effective manner.

In a co-pending application, issued as U.S. Pat. No. 7,063,118 to David E. Hauber, James P. Martin, Michael J. Pasanen, Robert J. Langone and Scott F. Miller which is also assigned to the present assignee, there is described a novel method and apparatus to reinforce various structural shapes with single strips of prepreg tape also being applied in a single direction. To reverse or change the tape laying direction with said apparatus generally requires rotation of the tape laying head or returning the tape laying head to the original start position in order to deposit additional reinforcement tape on the structural shape. Such interruption of the tape laying procedure limits throughput of the tape being applied as well as complicates the equipment and control means being needed for unproductive apparatus movement. Said already known method and apparatus employs continuous fibers selected from the group consisting of ceramics, metals, carbon, glass compositions and organic polymers which has been preimpregnated with a resin binder and further provided with a releasable backing layer. In applying said tape, the disclosed automated apparatus employs a laterally moving head member having a novel cut and restart mechanism enabling the tape to be cut while still being fed after removal of the customary backing layer. The disclosed tape laying head member applies the unbacked reinforcement tape to the surface of the structural shape being laminated with conventional compact roller means, said head member further having a pair of operationally cooperating mechanisms to first strip the backing layer from the composite tape while being fed to the structural shape surface and thereafter sever a predetermined length of the unbacked tape from the tape supply spool while still being continuously transported in the apparatus. The backing removal mechanism in the disclosed apparatus includes means enabling separation of the backing layer from the moving tape while further accumulating the removed backing layer in the apparatus with a motor driven return spool. The disclosed tape laying head member still further includes mechanical cutter means which cooperate operationally with pinch roller means enabling forward tape movement when being fed while preventing backward tape movement during tape severance with said cutter means. Conventional associated electrical control means in the disclosed apparatus operates said head member in a preprogrammed sequential manner.

The above disclosed method and apparatus to automatedly laminate various structural shapes in said manner with multiple layers of continuous fibers preimpregnated with a resin binder still remains unduly complex and expensive. Tape laydown in said manner has been found to be relatively slow and require process interruption which understandably increases the cost of manufacture. Moreover, the size and complexity of said apparatus for tape laydown causes excessive downtime to be experienced during continuous equipment operation. Minimizing or eliminating such observed disadvantages found with the above disclosed method and apparatus for tape laydown would thereby prove beneficial in reducing manufacturing costs for the resulting laminated article.

It is an important object of the present invention, therefore, to provide a novel apparatus enabling multi-directional tape laydown in an improved automated manner.

It is still another important object of the present invention to provide a novel method for multi-directional tape laydown.

Still another important object of the present invention is to provide a novel automated tape laying apparatus enabling multiple strips of the reinforcement tape to be concurrently applied.

A still further object of the present invention is to provide a novel method for concurrent deposition of multiple reinforcement tape strips.

These and still further objects of the present invention will become more apparent upon considering the following more detailed description of the present invention.

SUMMARY OF THE INVENTION

It has now been discovered by the present applicant that satisfactory deposition of the fiber prepreg can be carried out more effectively with a modified tape laying member providing multi-directional tape laydown in a particular manner. More specifically, the present apparatus employs a novel laterally moving tape laying head member having multiple spaced apart tape depositing means which are individually operated during the selected travel direction of said moving head member. Having the multiple tape deposition means in the present head member spaced apart in an opposing spatial relationship allows reversing direction by said head member without head rotation. The continuous fiber tape being alternately applied in such manner can be deposited on the structural shape with single compaction roller means after backing removal. Each of the multiple tape deposition means in the present head member includes a pair of operationally cooperating mechanisms to first remove the backing layer from the reinforcement tape and thereafter sever a predetermined length of the unbacked tape from the tape supply while still being continuously fed. Removal of the backing layer in the present head member further includes accumulation of the removed backing layer while each of the tape severing mechanisms in the multiple tape deposition means of the present head member include mechanical cutter means which cooperate with pinch roller means enabling forward tape movement when being fed while preventing backward tape movement during tape severance with said cutter means. The herein defined method of operating the present apparatus understandably permits controlled movement of the movable tape laying member in various directions achieved with programmed software instruction. It follows therefrom that already known program controllers or software programmed computers can direct all lateral and vertical movement required of the tape laying member in the present apparatus.

The present tape laying head member can still further include multiple tape supply and associated backing removal mechanisms for each of the multiple tape deposition means incorporated therein. In so doing, multiple strips of the reinforcement tape can be concurrently applied while the moving head member conducts a single traverse. The prepreg tape selected for such purpose can further include backing layers disposed on both major surfaces to better enable release of the tape from tape supply spools as well as to help avoid adhesion of the unbacked tape to surfaces physically contacted in the head member. When concurrently applying multiple tape strips with this type tape, however, each tape supply spool is desirably associated with a pair of rewind spools for accumulation of both backing layers being removed. The concurrent tape strip deposition is desirably further carried out in the present apparatus with all tape strips being transported to a single compaction roller provided in the head member which exerts a compressive force on the deposited strips. Suitable continuous fiber tape for deposition in the present apparatus include both thermoset and thermoplastic prepregs having a releasable storage layer, such as paper, plastic and the like. Prepregs of this type are already well known and commercially available including thermoset type prepregs having an uncured resin matrix for later curing by also well known customary procedures. Movement and position commands given automatedly to the tape laying head member in the present apparatus determines the tape laydown pattern. Accordingly, said automated control of the present apparatus can enable repetitive tape deposition from the same start position as well as depositing tape from different locations. Movement of the tape laying head during tape laydown can also be controlled with programmed instruction in still other respects. For example, such controlled movement of the head member along the length of already deposited tape enables the included compaction roller means to exert any desired additional compressive action. Similarly, the operational speed at which said included compaction roller means is controlled can be maintained in the present apparatus no greater than the laydown speed of the tape deposition.

In a representative embodiment, the tape laying member in the illustrated apparatus contains all structural mechanisms required for deposition of a single reinforcement type thermoset prepreg tape from a laterally moving head member having duplicate bi-directional tape deposition means. Each of said tape deposition means includes a single pair of rotating spools to continuously supply the tape being applied while also rewinding the single backing layer being continuously removed from the supplied tape before its deposition. Motor driven pinch roller means provided in each tape deposition means feeds the tape being continuously transported to further included single compaction roller means disposed in the head member. Separation of the single backing layer from the continuously moving tape when being supplied alternately to said compaction roller means in the illustrated head member occurs immediately after passage through said pinch roller means in the respective tape deposition means. A guillotine cutter mechanism in each of said tape deposition means finally severs the alternately deposited tape and with all of said included mechanisms in both tape deposition means being instructed with associated program controller means to be more fully described hereinafter. It is further contemplated in the present method to manually feed the tape being employed to the tape laying head member before automated operation is initiated while also having the selected tape being manually trimmed before starting the automated operation. Similarly, it is contemplated that the present apparatus and method can also be used for end-product applications other than structural reinforcement such as fabrication of isogrid structures, fiber placement, filament winding and fiber preforms.

DETAILED DESCRIPTON OF THE PREFERRED EMBODIMENTS

Figure 1:
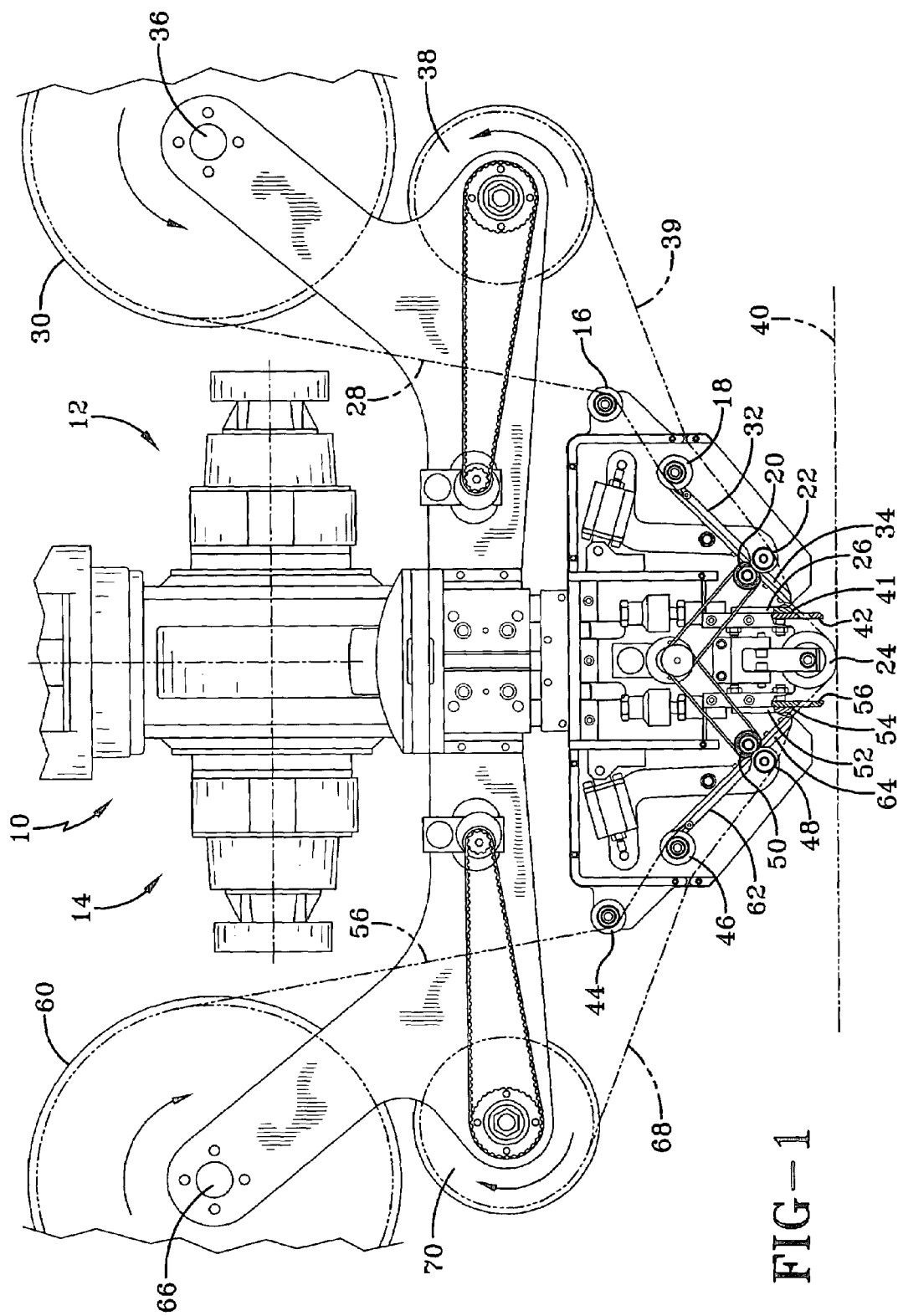
FIGS. 1 and 1A both depict a schematic side view for a representative tape laying apparatus according to the present invention.

Referring to the drawings, there is shown in FIG. 1 a schematic side view for a tape laying apparatus according to the present invention. Basically, said movable tape laying member 10 houses duplicate spaced apart tape deposition means 12 and 14 which individually apply a predetermined length of the prepreg tape when said tape laying member is moving in different selected travel directions. To further illustrate said manner of tape deposition, the right side means of tape deposition 12 can deposit tape while the moving head member proceeds in one selected travel direction with the left side means of tape deposition 14 applying tape when the head member reverses its travel direction. Tape deposition means 12 includes a first pair of operationally cooperating guide or idler rollers 16 and 18, a second pair of operationally cooperating pinch rollers 20 and 22, a compaction roller 24 and a further included powered guillotine cutter mechanism 26. As can be observed, the resin impregnated tape 28 being continuously transported from supply spool 30 in the right side tape deposition means 12 of said tape laying member is guided during passage with suitably disposed chute guides 32 and 34. Said rotating tape supply spool member 30 in the illustrated embodiment includes tension control means, such as a conventional friction braking mechanism 36 and the like to avert tape unwinding when not being pulled forward by cooperating motor driven spool member 38. Said motor driven spool 38 continuously removes the backing layer 39 from the supplied tape by simply rewinding the separated backing layer about the spool circumference. Such backing layer removal from the moving tape occurs at the exit end of chute guide 34. Simply having the backing layer pulled away in a different direction by said motorized spool 38 effects the desired separation. The unbacked tape next proceeds in a continuous manner during tape deposition to said compact roller 24. Compaction roller 24 in the tape laying member exerts a compressive force to the applied tape by having physical contact with the top surface 40 of the particular structural shape being laminated as the unbacked tape is being deposited thereon. Cutter mechanism 26 employs paired blades 41 and 42 having an open space therebetween for unbacked tape passage until being actuated to sever the tape material. Actuation of said cutter means can employ a conventional pneumatic cylinder (not shown) to enable blade movement when instructed by the fully automated electrical control means (not shown) operating the present apparatus. Tape severance in said manner can proceed in a direction substantially perpendicular to the tape feed direction as well as in various bias directions. Under further instructions from said electrical control means, the illustrated bi-directional tape laying member can be automatedly moved forward from an initial start position to deposit a predetermined length of the applied tape and thereafter move to a next start position for additional tape deposition. Said automated control procedure further enables substantially instantaneous restart of the present tape deposition procedure.

Figure 1A:
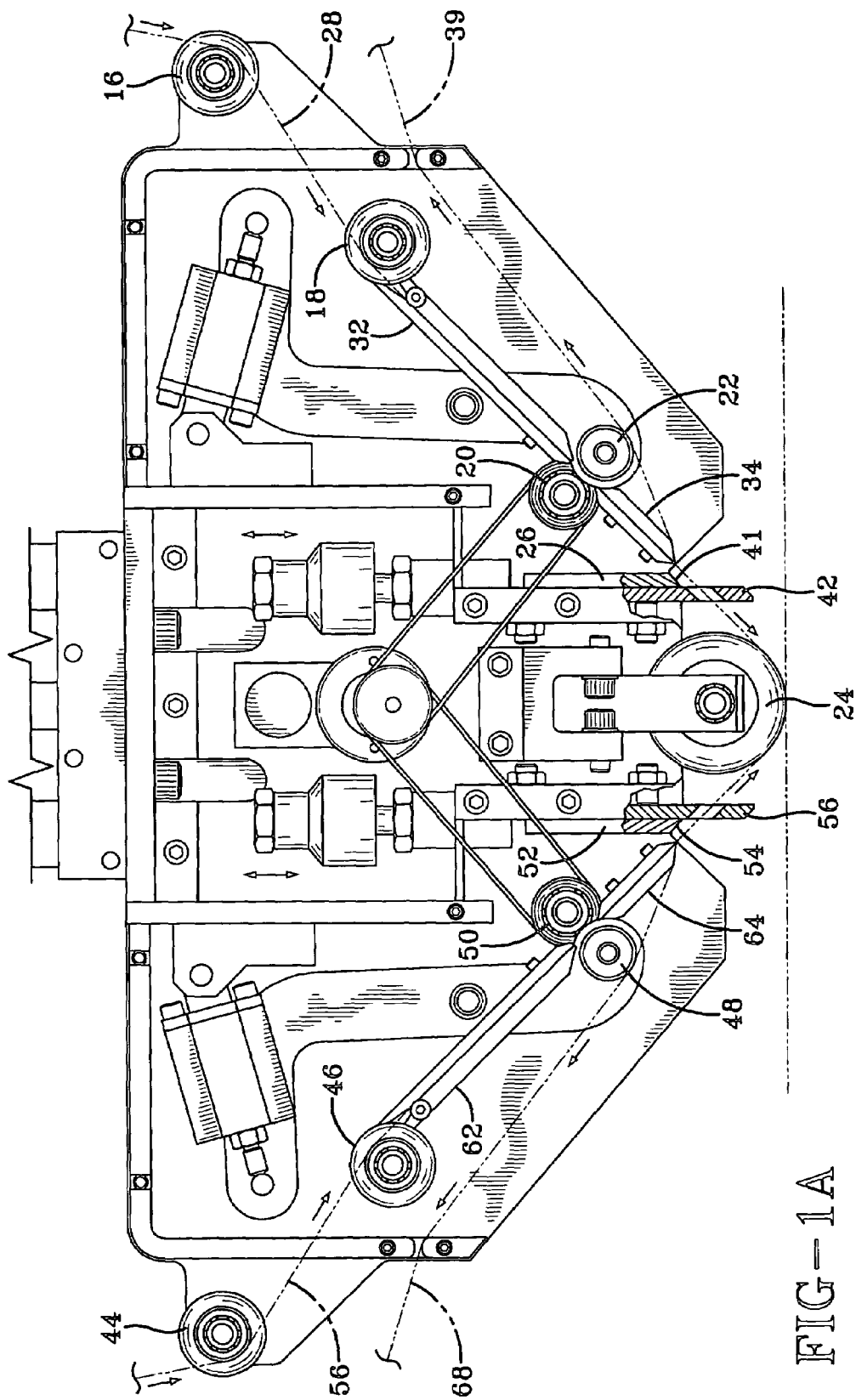

Left side tape deposition means 14 in the illustrated tape laying member is a mirror image of the above described right side tape deposition means (12). Having such duplicate tape deposition means in the present tape laying head member enables said head member to immediately adopt a different travel path without requiring head rotation. Accordingly, said left side deposition means 14 includes additional guide rollers 44 and 46, additional pinch rollers 48 and 50 and a further included powered guillotine cutter mechanism 52 provided with paired blades 54 and 56. The resin impregnated tape 58 being supplied from additional supply spool 60 in said left side deposition means passes through guide chutes 62 and 64 under tension control means 66 associated with the tape delivery. Backing layer 68 is again removed from the supplied tape with additional motorized spool member 70 at the exit end of guide chute 64. The open-space again provided between cutter blades 54 and 56 allows passage of the unbacked tape therebetween until being severed for delivery to the single compaction roller 24 being employed in the illustrated tape laying head member. FIG. 1A simply provides an enlarged partial view of the FIG. 1 tape laying member further depicting movement of both tape members (28 and 58) and cutter mechanisms (26 and 52) during tape lay down in alternate head travel directions.

Figure 2:
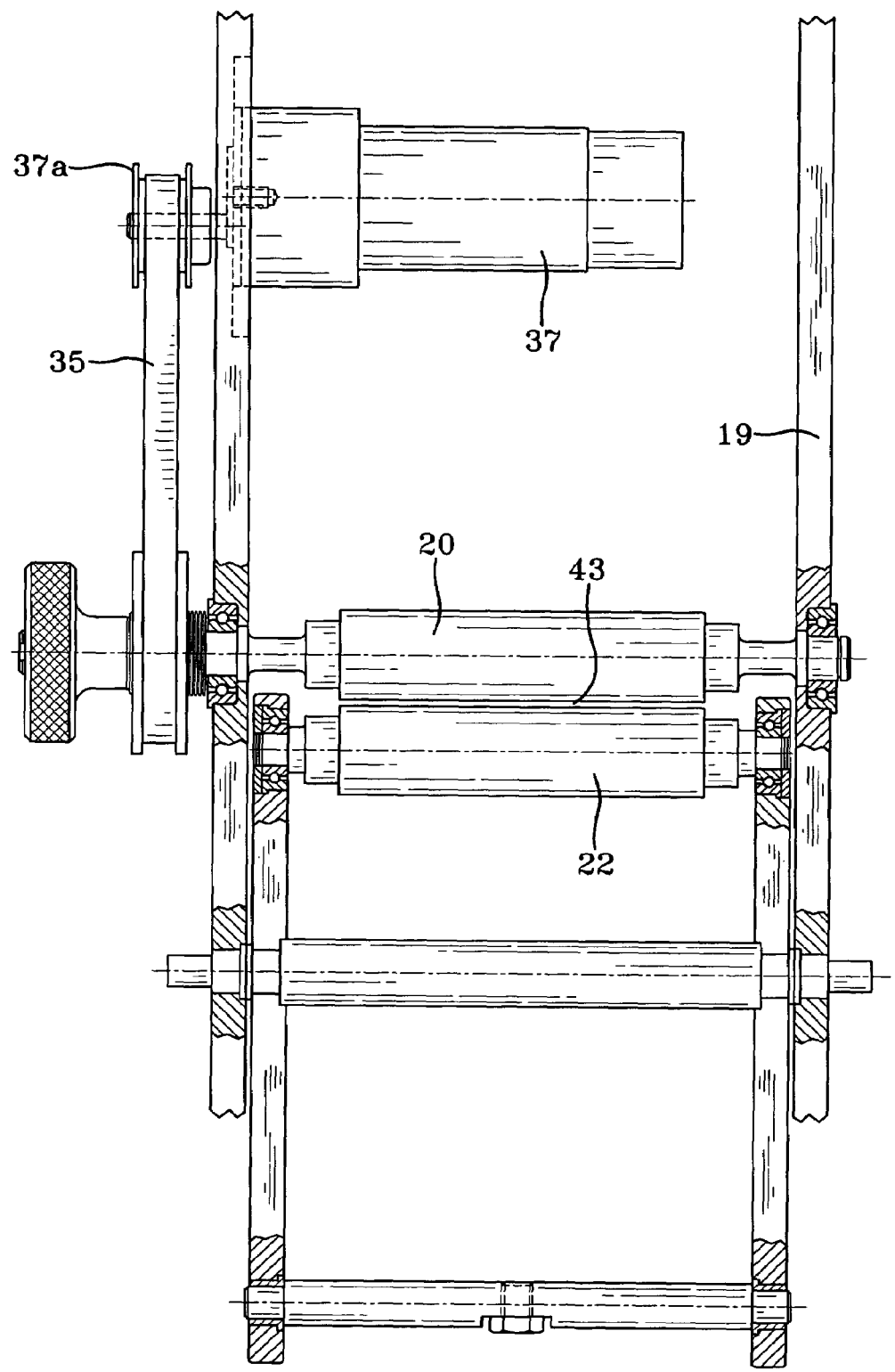
FIG. 2 is an end view depicting the motor driven pinch roller assembly in the FIG. 1 tape laying apparatus.

FIG. 2 is an expanded end view depicting the motor driven pinch roller means being employed in each of the above described tape deposition means 12 and 14. Duplicate construction for said tape deposition means in the illustrated tape laying head member requires only that construction for the right side tape deposition means (12) be further described. Top pinch roller 20 in said right side tape deposition means is connected with a conventional flexible drive belt 35 to electric motor 37 further contained in head member 10 to rotate said roller at a suitable rotational speed transporting the tape being supplied with assistance from the cooperating motor driven spool 38 also being operated in said head member. A conventional slip clutch 37a further connected to motor 37 provides the means for forward tape movement during tape transport while also preventing tape slippage. In said manner, the end of the tape being fed remains held between the cooperating pinch rollers 20 and 22 after cutter mechanism 26 severs a predetermined length of the already applied unbacked tape. Roller 20 is motor driven to assist with automated tape transport in the illustrated tape laying head member. When doing so, an open space 43 is maintained between rollers 20 and 22 for continuous tape passage therethrough until a pivot arm 19 connected to roller 22 is instructed by the associated electrical control means to bring both rollers into physical engagement. Such roller engagement halts tape movement momentarily allowing the particular cutting means being employed to sever the unbacked tape length and with roller 22 also being returned again to its open position by the employed automated control means for additional tape passage. Such fully automated procedure for cut and restart with each tape deposition means in the illustrated head member understandably enables a more simple cutter mechanism being required. Actuation of both guillotine type cutter mechanisms (26 and 52) in the illustrated head member is further responsive to the included program instructions contained in the overall electrical control means operating said head member. Said programmed instruction enables movement of the illustrated head member in assorted spatial directions as well as controls movement during tape laydown. For example, operational head member movement is desirably maintained not to exceed the speed at which the backing layer is being removed from the resin impregnated tape. Movement of the illustrated head member can likewise be controlled for many other unrelated purposes. Thus, said head member can be programmed for subsequent movement along the length of already deposited tape to exert further compressive action when desired.

Figure 3:
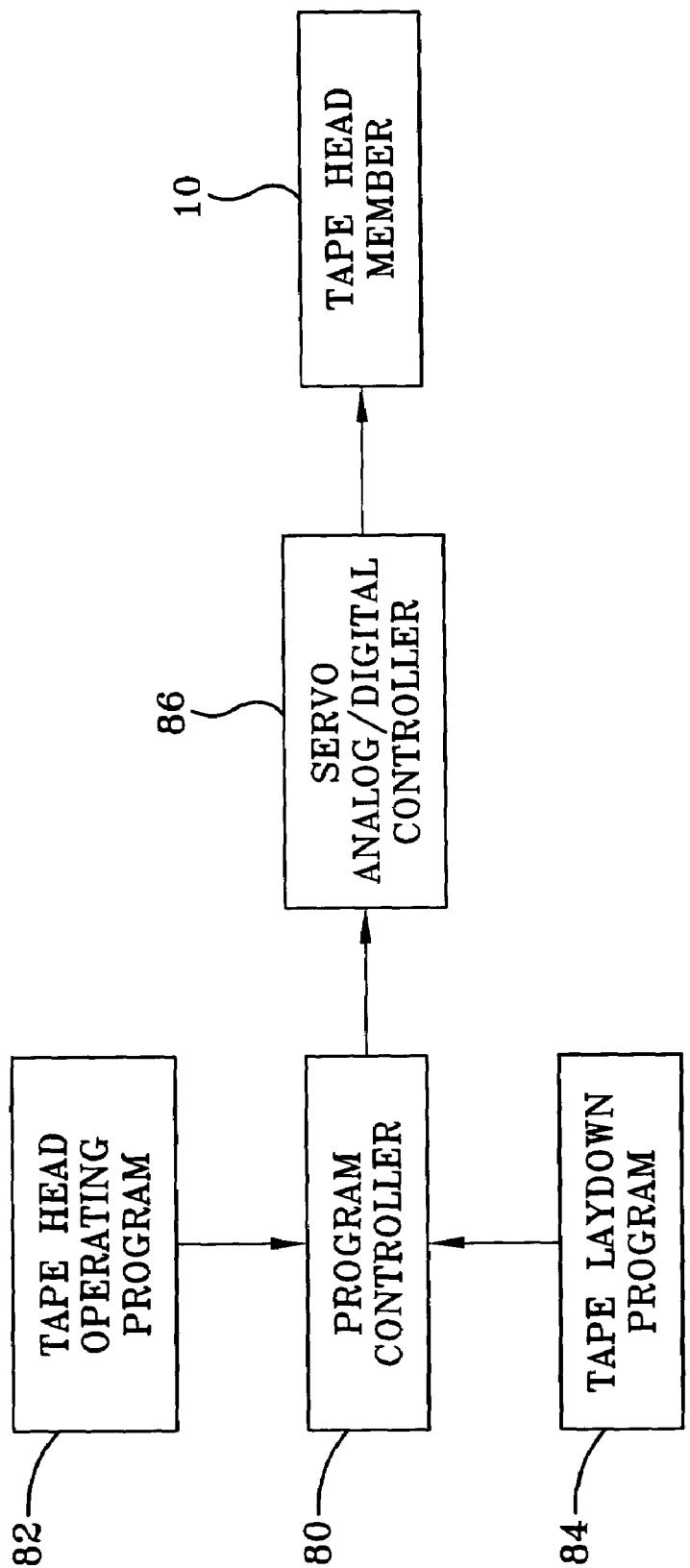
FIG. 3 is a block diagram for representative preprogrammed controller means to automatedly operate the FIG. 1 tape laying apparatus.

There is depicted in FIG. 3 a block diagram illustrating a representative programmed controller means to operate the FIG. 1 tape laying apparatus. In such control means, a conventional programmed controller 80 or equivalent data processor is programmed to regulate motion and control of the FIG. 1 tape laying member 10. A first instruction program 82 is provided to said program controller for operation of all above described component mechanisms incorporated in said tape laying member responsive to the given commands. A second instruction program 84 is similarly entered into the program controller 80 to determine the tape laydown pattern with movement of said head member. All movement and position commands for said head member are executed by said program-controller 80 for head member operation in accordance with said commands. In doing so, said commands desirably include the geometric information needed to dictate the tape laydown path and tape length to a further conventional servo type analog/digital processor 86 receiving the program controller commands. The output signals from processor 86 thereby automatedly regulates operation of said tape laying head member 10 with respect to directed machine action including motion control, tape length, cutter control, roller control and still other desirable actions such as tape restart and tape tack down.

Figure 4:
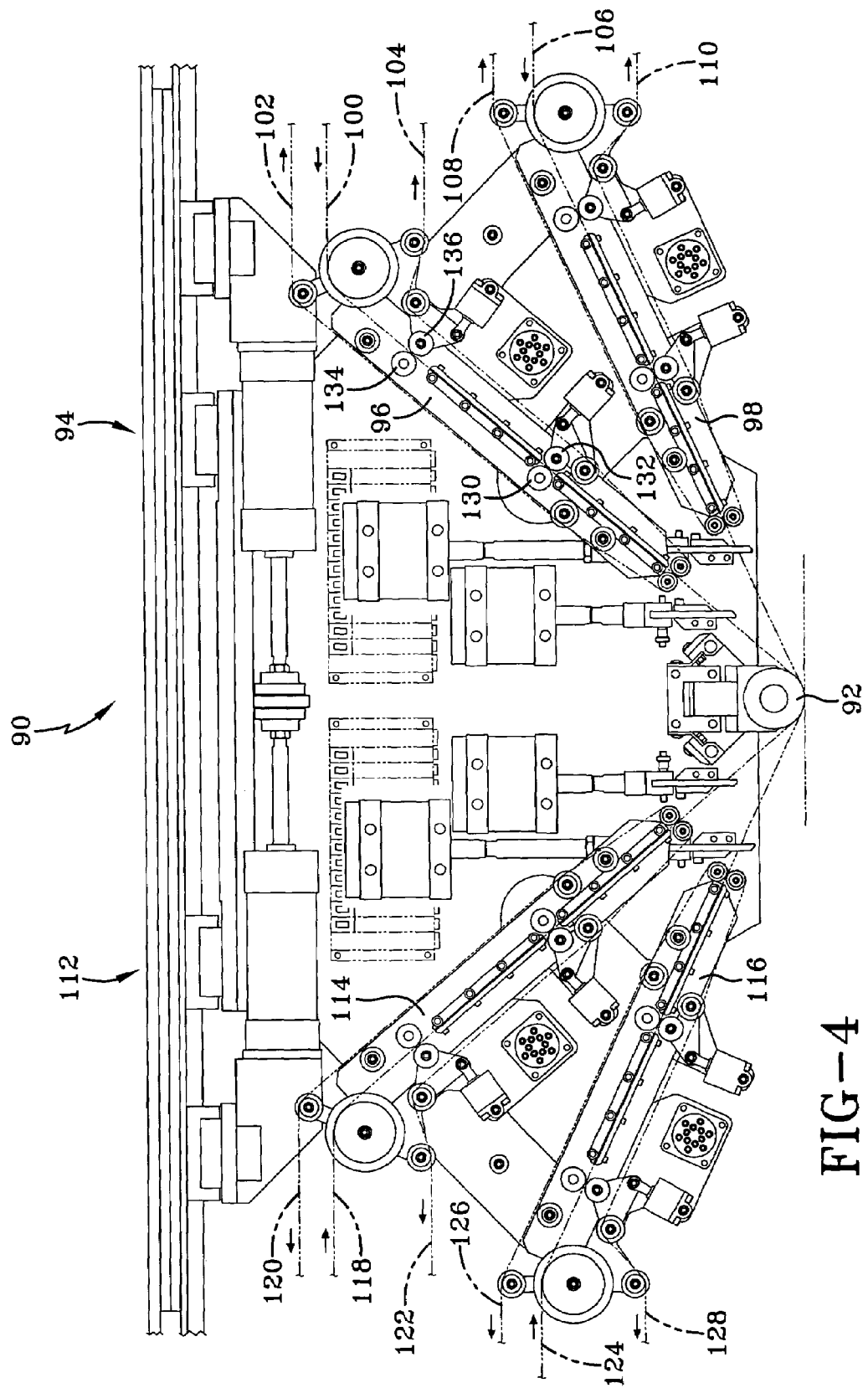
FIGS. 4 and 4A are a schematic side view both depicting a different tape laying apparatus of the present invention.

FIG. 4 is a schematic side view depicting another representative tape laying apparatus of the present invention enabling superior amounts of the resin impregnated tape to be deposited therefrom with less process interruption. In doing so, the improved apparatus includes multiple tape supply spools in each of the multiple spaced apart tape deposition means being employed in order to process tape having a removable backing layer on both major surfaces. Employing a double backed tape in the apparatus permits faster rates of tape deposition to be employed which is attributable in part to better release of the tape from the tape supply spools as well as avoiding adhesion of the unbacked tape to surfaces physically contacted in the head member. A utilization of such double backed tape in the improved apparatus further requires duplication of the means for backing layer removal from each supply spool in the apparatus, however, in order to store the removed backing layers in the moving head member without process interruption. Multiple tape delivery assemblies provided in each of the spaced apart tape deposition means of the improved apparatus can still further increase the rate of tape being applied in accordance with the present invention.

Referring to FIG. 4, there is shown a tape laying head member 90 of the present apparatus having multiple tape delivery means oriented in a side by side relationship for a concurrent supply of multiple tape strips to a common compaction roller 92. In the right side tape deposition means 94 of said head member there is shown a pair of said multiple tape delivery assemblies 96 and 98 which each include the same type rotating tape supply spools, backing layer removal and tape severing mechanisms previously described. Since the multiple parallel oriented tape supply spools (not shown) in the present embodiment are processing double backed resin impregnated tape, however, each of the included tape supply spools is further operationally associated with a pair of cooperating rewind spools (also not shown) to accumulate both removed backing layers while moving the head member. A prepreg tape 100 in tape delivery assembly 96 is accordingly processed in such manner to deliver the multiple tape strips to compaction roller 92 with backing layers 102 and 104 being stored in the moving head member. Likewise, a second prepreg tape 106 in the tape delivery assembly 98 proceeds in the same manner for delivery of additional multiple tape strips to said compaction roller while also storing backing layers 108 and 110 in the moving head member. Identical spaced apart tape deposition means 112 are also provided on the left side to the presently described head member for tape laying when the head member is programmed for movement in a different travel direction. In accordance therewith, another pair of tape delivery assemblies 114 and 116 having the herein described construction are employed to furnish additional multiple unbacked tape strips in a concurrent manner to the common compaction roller 92. Tape delivery assembly 114 thereby furnishes multiple unbacked tape strips 118 to said compaction roller while accumulating backing layers 120 and 122 in the head member during said head movement in an alternate travel direction. Similarly, tape delivery assembly 116 furnishes multiple unbacked tape strips 124 to said compaction roller while the tape laying member 90 proceeds in said alternate travel direction and stores the double backing layers 126 and 128 from each tape supply spool during head movement. A simplified method to achieve multiple tape control is accordingly illustrated in FIG. 4. Multiple tapes are fed through the head in the same planes as tapes 100, 106, 118 and 124 by adding additional feed assemblies within a given plane. Thus the feed rollers, 130 for example, must be capable of feeding multiple tapes in parallel. This is achieved in the present invention by driving a single feed roller, 130 for example, and feeding individual tapes by engaging the appropriate pinch roller, 132 for example, while pinching a selected tape against the rotating feed roller. In order to allow all tapes to be fed and cut individually, an additional set of rollers, 134 and 136 for example, are employed. The one-way clutching action of these clamp rollers ensures that an individual tape is held in place after cutting while others are being fed.

Figure 4A:
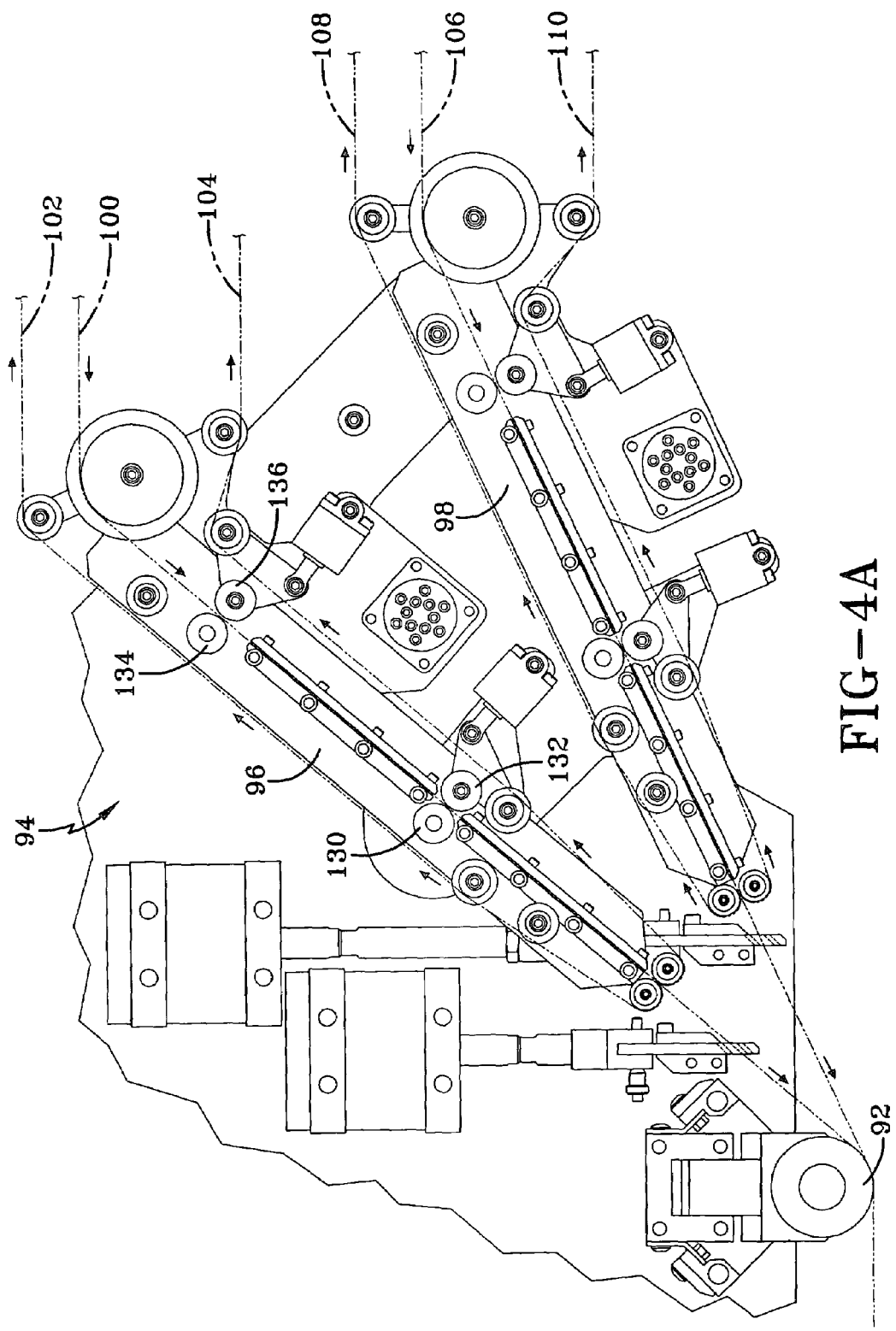

Understandably, such demonstrated bi-directional tape laydown of a double backed tape in the present embodiment enables higher rates of tape deposition to be employed without delays being encountered in processing due to tape hang-up as well as head member contamination from fibers and/or resin. As distinct from the FIG. 1 tape laying member wherein a single tape is fed and cut from each of the duplicate tape depositions means (12 and 14), the FIG. 4 tape laying member allows multiple tape control combined with the ability to feed and cut multiple tapes independently of each other. FIG. 4A also provides an enlarged partial view of the FIG. 4 tape laying member still further depicting the multiple tape movement during laydown which takes place in the right side tape deposition means 94 of the illustrated bi-directional head member when operationally engaged.

It will also be apparent from the foregoing description that a broadly useful apparatus and method has been provided to continuously apply continuous fiber prepreg tape to form various laminated articles. It is contemplated that various modifications can be made in the present apparatus and method than herein illustrated, however, without departing from the spirit and scope of the present invention. For example, it is further contemplated that the present invention can be employed for any end product application requiring the positioning, cutting and deposition of a composite fiber prepreg tape in multiple directions, include tape impregnated with either thermoplastic or thermoset resin binders. Such end product applications include but are not limited to the fabrication of isogrid structures, fiber placement, filament winding and fiber performs. Similarly, other and already known digital and analog control means are contemplated to regulate tape laydown in the present apparatus than herein illustrated. Accordingly, it is intended to limit the present invention only by the scope of the appended claims.

What I claim as new and desire to secure by Letters Patent of the United States is:

1. An automated composite tape laying apparatus to form a laminated structural shape having a plurality of deposited surface layers of continuous fibers selected from the group consisting of ceramics, metals, carbon, glass compositions and organic polymers which have been preimpregnated with a resin binder and provided with a releasable backing layer on both major surfaces, said apparatus including multi-directional tape laying means comprising:

(a) a laterally moving head member to continuously apply the resin impregnated tape to the surface of said structural shape with compaction roller means from multiple spaced apart tape depositing means feeding the tape alternately to said compaction roller means when the head member is moving in another travel direction, each of said multiple tape depositing means having a pair of operationally cooperating mechanisms to first remove the backing layers from the resin impregnated tape and thereafter sever a predetermined length of the unbacked tape from the tape supply while still being continuously fed, (b) each backing layer removal mechanism having means enabling separation of the backing layers from the moving tape while further continuously accumulating the removed backing layers, (c) each tape severing mechanism including mechanical cutter means which cooperate with pinch roller means enabling forward tape movement when being fed while preventing backward tape movement during tape severance with said cutter means, (d) associated electrical control means to operate said head member in an automated sequential manner.

2. The apparatus of claim 1 wherein said head member applies successive strips of the resin impregnated tape as instructed by the associated electrical control means without requiring head rotation.

3. The apparatus of claim 2 wherein the multiple tape depositing means are spaced apart in reverse travel directions.

4. The apparatus of claim 1 wherein the resin impregnated tape being employed is supplied from multiple spools incorporated in each of said tape depositing means.

5. The apparatus of claim 4 wherein said multiple spools include tension control mechanisms.

6. The apparatus of claim 1 wherein the backing layers being removed are accumulated with powered spools incorporated in each of said tape depositing means.

7. The apparatus of claim 1 wherein the cutter means includes a moving blade.

8. The apparatus of claim 1 wherein the associated electrical control means includes a preprogrammed electrical controller.

9. The apparatus of claim 8 wherein the movement and position commands given to said head member from the preprogrammed electrical controller determines the tape laydown pattern.

10. The apparatus of claim 8 wherein the preprogrammed electrical controller comprises a software programmed computer.

11. An automated reinforcement tape laying apparatus to form a composite laminated structural shape having a plurality of deposited surface layers of continuous reinforcement fibers selected from the group consisting of ceramics, metals, carbon, glass compositions and organic polymers which have been preimpregnated with a resin binder and provided with a releasable backing layer on both major surfaces, said apparatus including, multi-directional tape laying means comprising:

(a) a laterally moving head member to continuously apply the resin impregnated tape to the surface of said structural shape with compaction roller means from a pair of spaced apart tape depositing means feeding the tape alternately to said compaction roller means when the head member is moving in another travel direction, each of said tape depositing means employing multiple tape supply spools and having a pair of operationally cooperating mechanisms to first remove both backing layers from the resin impregnated tape and thereafter sever a predetermined length of the unbacked tape from the tape supply while still being continuously fed, (b) each backing layer removal mechanism having means enabling separation of both backing layers from the moving tape while further continuously accumulating the removed backing layers, (c) each severing mechanism including mechanical cutter means which cooperate with pinch roller means enabling forward tape movement when being fed while preventing backward tape movement during tape severance with said cutter means, and (d) preprogrammed electrical controller means providing movement and position commands to said head member for determination of the tape laydown pattern.

12. The apparatus of claim 11 wherein said multiple tape supply spools include tension control mechanisms.

13. The apparatus of claim 11 wherein the multiple backing layers being removed are accumulated with motorized spools incorporated in each of said tape depositing means.

* * * * *